UNITED STATES PATENT OFFICE.

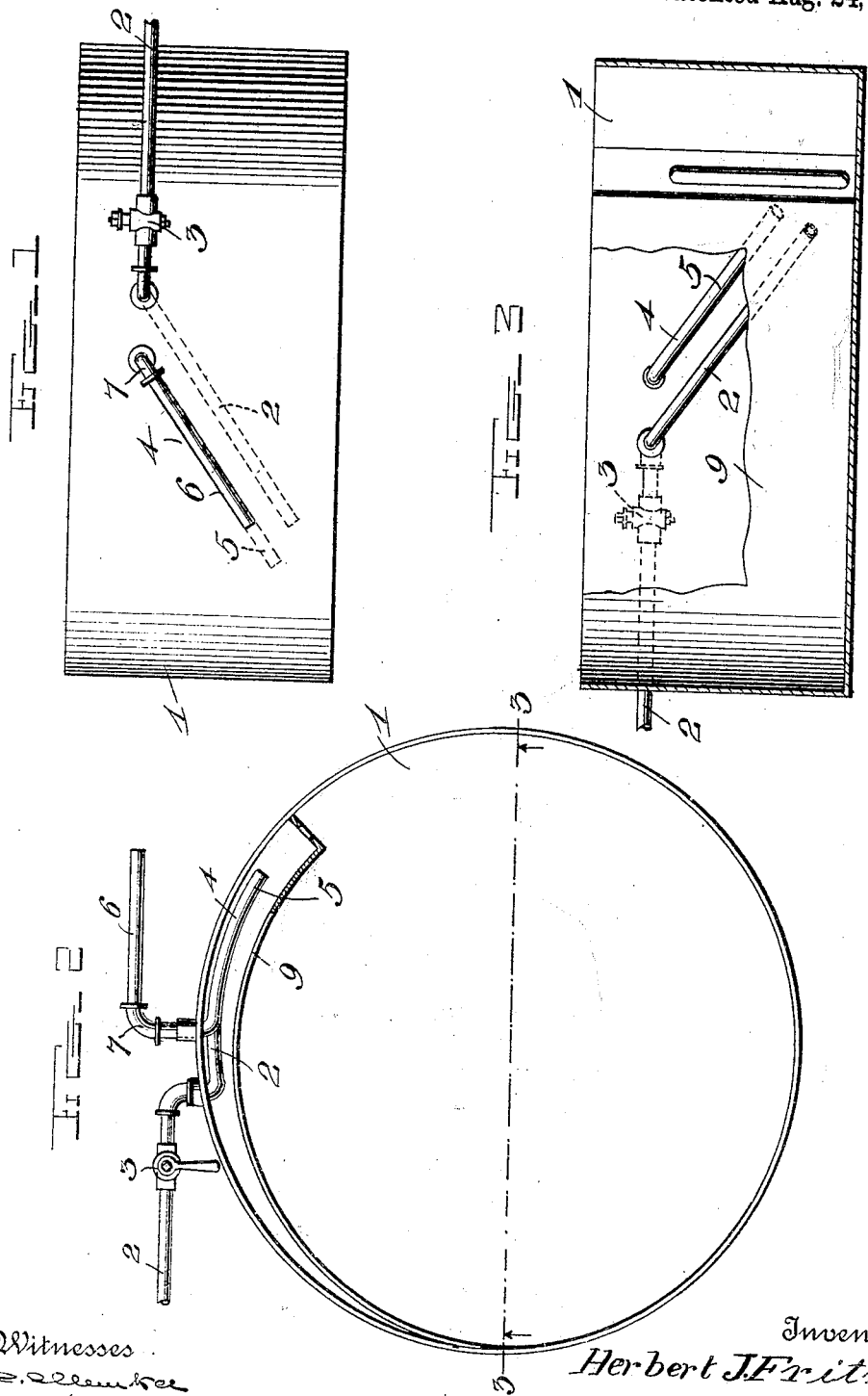

HERBERT J. FRITZ, OF ALBERT LEA, MINNESOTA.

WASHING APPARATUS FOR PHOTOGRAPHIC PRINTS OR THE LIKE.

932,265.  Specification of Letters Patent.  Patented Aug. 24, 1909.

Application filed August 13, 1908. Serial No. 448,363.

*To all whom it may concern:*

Be it known that I, HERBERT J. FRITZ, a citizen of the United States, residing at Albert Lea, in the county of Freeborn and State of Minnesota, have invented certain new and useful Improvements in Washing Apparatus for Photographic Prints or the Like; and I do declare the following to be a full, clear, and exact description of the invention, such as will enable others skilled in the art to which it appertains to make and use the same.

This invention relates to improvements in washing apparatus, and while especially designed as a means for washing photographic prints, may be used in any other connection where a device of this kind would be advantageous.

The principal object of the invention is to provide means for creating a continuous circulation of water through a suitable receptacle so that the water will remain clear at all times.

A secondary object of the invention is to provide means whereby the water receptacle may be readily drained or the water maintained in the receptacle at any desired level.

With these and other objects in view, the invention consists of certain novel features of construction, combination and arrangement of parts, as will be more fully described and particularly pointed out in the appended claims.

In the accompanying drawings, Figure 1 is a side elevation of the apparatus; Fig. 2 is a plan view thereof; and Fig. 3 is a section taken on the line 3—3 of Fig. 2 looking in the direction indicated by the arrows.

In the embodiment illustrated, the device comprises a suitable receptacle 1, which as shown is of cylindrical form, and 2 a suitable supply pipe which enters the receptacle at any desired point and extends preferably to a point near the bottom thereof, said supply pipe being equipped with a suitable valve 3 to cut-off the supply of fluid, when desired. The numeral 4 indicates the siphon or discharge pipe which comprises an inner portion 5 which extends toward the bottom of the tank and an outer portion 6 which is arranged on the outside of the tank, and is connected with the upper end of the inner portion by an elbow 7, the outlet portion extending also downwardly toward the bottom of the tank at a common inclination with the inlet portion. The upper end of the inlet portion of the discharge pipe, as shown, is loosely mounted in the wall of the receptacle and may be raised or lowered by means of the outlet portion of the pipe. A suitable shield 9 is arranged at the inner surface of the receptacle as a protection for the supply pipe and inlet end of the discharge pipe.

The operation of the device will be understood. The water is supplied to the tank by the supply pipe 2, until at a sufficient height to flow through the discharge pipe, the relative sizes of the inlet and outlet pipes being such as to maintain the water at the same level. When the valve 3 is opened it will thus be seen that a continuous circulation of water is established through the water receptacle and the waste chemicals from the prints, as well as any other foreign matter is carried off, and for this reason the water in the receptacle is always clear, and will give the best results. To drain the receptacle the valve 3 is cut-off and the water passes through the discharge pipe until below the level of the inlet portion thereof, it being evident that the level of the water in the tank when the valve is cut-off will be regulated by raising or lowering the inlet portion of the discharge pipe.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is:—

1. An apparatus of the class described comprising a receptacle, a supply pipe leading thereinto, a siphon or discharge pipe having an inner portion extending into the tank above the inner portion of the supply pipe, and valves in the supply and siphon pipes for controlling the circulation of the washing fluid through the tank.

2. An apparatus of the class described comprising a receptacle, a supply pipe leading thereinto, a siphon or discharge pipe having an inner portion extending into the tank above the inner portion of the supply pipe, valves in the supply and siphon pipes for controlling the circulation of the washing fluid through the tank, and a vertical shield or guard arranged at the inner surface of the receptacle as a protection for the inner portions of the supply and siphon pipes.

3. An apparatus of the class described comprising a cylindrical receptacle, a supply pipe leading thereinto, a discharge or siphon pipe having an inner portion extending into and toward the bottom of the receptacle immediately above the inner portion of the supply pipe, an outer portion communicating with the upper end of the inner portion extending downwardly on the outside of the tank at a common inclination with the inner portion, the siphon pipe being revolubly mounted in the wall of the receptacle to provide for the vertical adjustment of its inner portion, and a vertical longitudinally curved shield arranged at the inner surface of the receptacle as a protection for the inner portions of the supply and siphon pipes.

4. An apparatus of the class described comprising a cylindrical receptacle, a supply pipe having an inner portion extending downwardly at an incline toward the bottom of the receptacle, a discharge or siphon pipe revolubly mounted in the wall of the receptacle immediately opposite the point of entrance of the supply pipe and having an inner portion extending downwardly on the inside of the receptacle directly above the inner portion of the supply pipe, and a vertical longitudinally curved guard or shield arranged at the inner surface of the receptacle to inclose the inner portions of the supply and siphon pipes.

5. An apparatus of the class described comprising a cylindrical receptacle, a supply pipe having an inner portion extending downwardly at an incline toward the bottom of the receptacle, a discharge or siphon pipe revolubly mounted in the wall of the receptacle immediately opposite the point of entrance of the supply pipe and having an inner portion extending downwardly on the inside of the receptacle directly above the inner portion of the supply pipe, a vertical longitudinally curved guard or shield arranged at the inner surface of the receptacle to inclose the inner portions of the supply and siphon pipes, and valves arranged in said pipes for controlling the circulation of the washing fluid through the tank.

In testimony whereof I have hereunto set my hand in presence of two subscribing witnesses.

BERT J. FRITZ.

Witnesses:
   E. A. NELSON,
   MOSS SUTLER.